US011059063B2

(12) United States Patent
Gutsmann

(10) Patent No.: US 11,059,063 B2
(45) Date of Patent: Jul. 13, 2021

(54) SPRAY DEVICE HAVING A REPLACEABLE CARTRIDGE

(71) Applicant: Bayer CropScience Aktiengesellschaft, Monheim am Rhein (DE)

(72) Inventor: Volker Gutsmann, Langenfeld (DE)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 0 days.

(21) Appl. No.: 16/107,372

(22) Filed: Aug. 21, 2018

(65) Prior Publication Data
US 2019/0037827 A1 Feb. 7, 2019

Related U.S. Application Data

(63) Continuation of application No. PCT/EP2017/066612, filed on Jul. 4, 2017.
(Continued)

(30) Foreign Application Priority Data

Jul. 11, 2016 (EP) ..................................... 16178764
Jul. 11, 2016 (EP) ..................................... 16178766

(51) Int. Cl.
A01M 7/00 (2006.01)
B05B 11/00 (2006.01)
(Continued)

(52) U.S. Cl.
CPC ............. B05B 9/08 (2013.01); A01M 7/0017 (2013.01); A01M 7/0046 (2013.01);
(Continued)

(58) Field of Classification Search
CPC ............. A01M 7/0046; A01M 7/0092; B05B 11/0054; B05B 15/65; B05B 9/08
(Continued)

(56) References Cited

U.S. PATENT DOCUMENTS 3,904,116 A * 9/1975 Jones .................... B05B 9/0866
239/127
3,964,689 A * 6/1976 Horvath, Jr. .......... B05B 7/2443
239/318
(Continued)

FOREIGN PATENT DOCUMENTS

DE 102013109785 A1 3/2015
EP 1378293 A1 * 1/2004 ......... B05B 12/1436
(Continued)

OTHER PUBLICATIONS

International Search Report dated Nov. 7, 2017 for PCT Application No. PCT/EP2017/066612, filed Jul. 4, 2017, 3 pages.
(Continued)

Primary Examiner — Joseph A Greenlund
(74) Attorney, Agent, or Firm — Morrison & Foerster LLP

(57) ABSTRACT

The invention relates to the application of liquid active substances with the acid of a portable spray device. The subject matter of the present invention is a system comprising a portable spray device and a replaceable cartridge that contains an active substance concentrate. The invention also relates to method for applying a liquid active substance formulation. In addition, the invention discloses a replaceable cartridge that has a memory unit in which information is stored relating to an adjustable dilution ratio for the active substance concentrate contained in the cartridge. The invention also relates to a spray device comprising a control unit that can be read out a memory unit of cartridge attached to the spray device and, on the basis of the read out information, adjust a dilution ratio for the active substance concentrate contained in the cartridge.

27 Claims, 1 Drawing Sheet

Related U.S. Application Data

Figure 1:
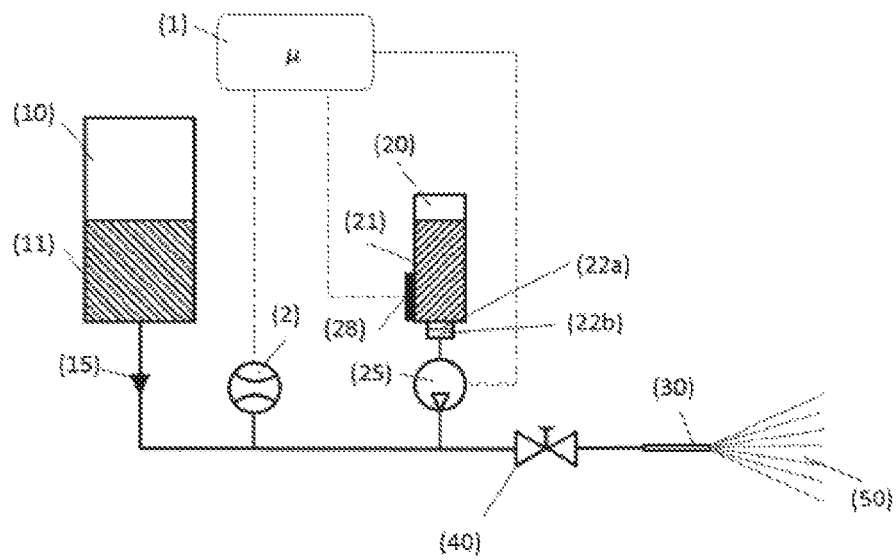

(60) Provisional application No. 62/360,548, filed on Jul. 11, 2016, provisional application No. 62/360,555, filed on Jul. 11, 2016.

(51) Int. Cl.
| | |
|---|---|
| *B05B 9/08* | (2006.01) |
| *B05B 12/14* | (2006.01) |
| *B05B 12/08* | (2006.01) |
| *B05B 7/32* | (2006.01) |
| *A01M 21/04* | (2006.01) |
| *A01M 25/00* | (2006.01) |
| *B05B 12/00* | (2018.01) |
| *B05B 12/12* | (2006.01) |

(52) U.S. Cl.
CPC ........ *A01M 7/0092* (2013.01); *A01M 21/043* (2013.01); *A01M 25/006* (2013.01); *B05B 7/32* (2013.01); *B05B 9/0861* (2013.01); *B05B 11/0054* (2013.01); *B05B 12/08* (2013.01); *B05B 12/1436* (2013.01); *B05B 9/0888* (2013.01); *B05B 12/006* (2013.01); *B05B 12/124* (2013.01)

(58) Field of Classification Search
USPC ........................................................ 239/154
See application file for complete search history.

(56) References Cited

U.S. PATENT DOCUMENTS

| | | | | | |
|---|---|---|---|---|---|
| 3,993,250 | A | * | 11/1976 | Shure | B05B 9/0861 239/332 |
| 4,544,084 | A | * | 10/1985 | Cleland | B67D 1/0028 137/892 |
| 4,618,099 | A | * | 10/1986 | Nagao | B05B 9/0861 222/333 |
| 4,651,903 | A | * | 3/1987 | Pagliai | A01M 7/0046 222/175 |
| 4,790,454 | A | * | 12/1988 | Clark | B67D 7/741 222/136 |
| 5,014,884 | A | * | 5/1991 | Wunsch | B05B 9/0861 222/333 |
| 5,150,841 | A | * | 9/1992 | Silvenis | B05B 7/0018 137/512.4 |
| 8,224,481 | B2 | * | 7/2012 | Bylsma | B01F 13/1066 700/239 |
| 2005/0006400 | A1 | * | 1/2005 | Shapanus | B05B 9/0861 222/1 |
| 2005/0121462 | A1 | * | 6/2005 | Allen, IV | B05B 9/085 222/31 |
| 2006/0102245 | A1 | * | 5/2006 | Kaechle | A01M 7/0046 141/18 |
| 2006/0249223 | A1 | * | 11/2006 | Leer | A01M 7/0046 141/18 |
| 2006/0261181 | A1 | * | 11/2006 | Wirz | A01M 7/0046 239/146 |
| 2006/0261188 | A1 | * | 11/2006 | Ito | A61L 9/14 239/306 |
| 2010/0230515 | A1 | * | 9/2010 | Wu | A01M 7/00 239/373 |
| 2010/0282866 | A1 | * | 11/2010 | Gilpatrick | B05B 1/34 239/310 |
| 2012/0175429 | A1 | * | 7/2012 | Zupsic | B05B 7/2467 239/8 |
| 2013/0186977 | A1 | * | 7/2013 | Fornaro | B05B 9/0888 239/127 |
| 2013/0193232 | A1 | * | 8/2013 | Dobias | A01M 7/0046 239/308 |
| 2014/0212334 | A1 | * | 7/2014 | Klein | B05B 7/0012 422/28 |
| 2015/0075116 | A1 | * | 3/2015 | Hepburn | A01M 7/0046 53/431 |
| 2015/0296764 | A1 | * | 10/2015 | Wirz Luchsinger | B05B 9/0877 239/120 |
| 2015/0297779 | A1 | * | 10/2015 | Conroy | B05B 12/081 239/1 |
| 2018/0236472 | A1 | * | 8/2018 | Villar Cloquell | B05B 7/26 |
| 2019/0351438 | A1 | * | 11/2019 | Mayer | A01M 7/0089 |

FOREIGN PATENT DOCUMENTS

| | | |
|---|---|---|
| WO | WO2013030117 A2 | 3/2013 |
| WO | WO2013165684 A2 | 11/2013 |

OTHER PUBLICATIONS

Unknown (May 1, 2002). "Metering and liquid distribution for plant treatment," Mesto, located at URL:http://www.mesto.de/fileadmin/user -upl oad/pdf/dosiertabelle.pdf, retrieved on Jan. 16, 2017, XP055335683: six pages.

Written Opinion of ISA report dated Nov. 7, 2017 for PCT Application No. PCT/EP2017/066612, filed Jul. 4, 2017, 8 pages.

\* cited by examiner

SPRAY DEVICE HAVING A REPLACEABLE CARTRIDGE

CROSS REFERENCE TO RELATED APPLICATIONS

This application is a continuation application of International Application No. PCT/EP2017/066612, filed internationally on Jul. 4, 2017, which claims the benefit of U.S. Provisional Application Nos. 62/360,548, filed Jul. 11, 2016 and 62/360,555, filed on Jul. 11, 2016, and European Application Nos. 16178766.8, filed Jul. 11, 2016 and 16178764.3, filed Jul. 11, 2016.

BRIEF DESCRIPTIONS OF THE DRAWINGS

Figure 2:
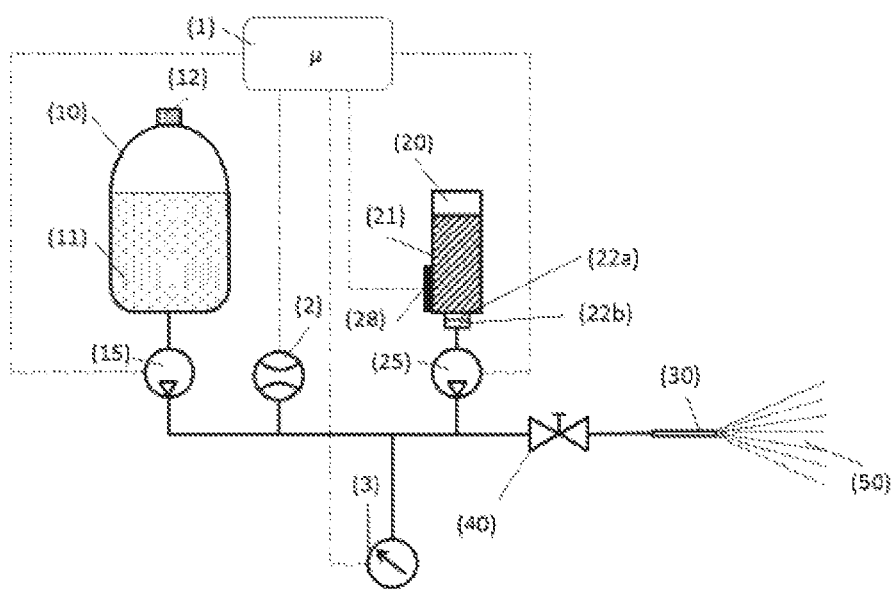

FIG. 1 illustrates a system including a portable spray device and a cartridge, according to some embodiments; and FIG. 2 illustrates a system including a portable spray device and a cartridge, according to some embodiments.

DETAILED DESCRIPTION

The present invention relates to the application of liquid active substances with the aid of a portable spray device. The subject matter of the present invention is a system comprising a portable spray device and a replaceable cartridge that contains an active substance concentrate.

The invention also relates to a method for applying a liquid active substance formulation. In addition, the invention discloses a replaceable cartridge that has a memory unit in which data are stored regarding an adjustable dilution ratio for the active substance concentrate contained in the cartridge. The invention also relates to a spray device comprising a control unit that can read a memory unit of the cartridge attached to the spray device and, on the basis of the read-out data, adjust a dilution ratio for the active substance concentrate contained in the cartridge.

Portable spray devices for applying active substances such as pesticides, insecticides, herbicides and fungicides are known (DE102013109785A1, US2006/0249223A1, US2006/0102245A1, US2005/0006400A1).

Widely used spray devices are those known as compression sprayers. They comprise a tank for holding the liquid to be sprayed. A pneumatic pump, generally manually operated, which is part of the tank, contains a conventional piston rod structure and an operating handle for this. This pneumatic pump is used to create an air pressure above the liquid to be sprayed. The pressurization of the tank is achieved in that the operator periodically operates the pump until a desired tank pressure has been reached. Because of the air pressure applied to it, the spray liquid emerges through a pipe immersed in the liquid in the tank and then flow through a tube, a spray jet valve at the outer end of the tube, an extension pipe and finally through a spray nozzle to the selected target area.

Today pesticides, herbicides and fungicides are increasingly sold in the form of concentrates. Concentrates have the advantage of lower transportation costs. The user must dilute the active substance before application. The instructions for dilution are usually found on the packaging or a package insert.

However, the dilution performed by the user is disadvantageous for the following reasons:

The user can come into unintended contact with the active substance. It is conceivable that the user will make a mistake when calculating the amounts of concentrate and diluent. High viscosity of the concentrate can lead to inaccurate volumetric portioning of the required amount.

Accurate application of active substances can have a number of undesired consequences: the treatment of the sprayed object may be ineffective, or overdosages may occur. It is possible that government specifications on quantities released may not be complied with. It is conceivable that errors in inventory monitoring may occur since the quantities released were calculated incorrectly.

An additional drawback of the above-described spray device is that the tank must first be cleaned when a different active substance is to be used. In some cases, it will be necessary to dispose of the cleaning fluid.

Starting from the prior art described, the object of this invention was to supply a device for application of active substances that is easy to use, does not require manual dilution of concentrates, releases an accurately definable amount of active substance, is convenient to transport and to be worn and transported by the user, in which expensive cleaning is not required, and that is suitable for versatile uses.

According to the invention this problem is solved by the subject matter of independent claims 1, 5, 8 and 11. Preferred embodiments can be found in the dependent claims and the present description.

A first object of the present invention is a cartridge containing a concentrate of a pesticide, insecticide, herbicide or fungicide, wherein the cartridge comprises means for reversibly connecting the cartridge to a spray device, characterized in that the cartridge has an electronic memory unit, and wherein data about a dilution ratio of concentrate to be set is stored in the memory unit.

An additional object of the present invention is a system comprising
  a container for holding a diluent,
  an outlet
  means for delivering the diluent in the direction of the outlet,
  means for reversibly connecting a replaceable cartridge containing a concentrate of a pesticide, insecticide, herbicide or fungicide to the spray device,
  means for delivering the concentrate in the direction of the outlet, and
  a control unit
characterized in that the control unit has means for reading a dilution ratio out of an electronic memory unit of a cartridge, and wherein the control unit has a regulating unit designed such that it dilutes the concentrate with the diluent corresponding to the dilution ratio.

An additional object of the present invention is a system comprising
  a portable spray device comprising the following components:
  a container for holding a diluent,
  an outlet,
  means for delivering the diluent in the direction of the outlet,
  means for reversibly connecting a replaceable cartridge containing a concentrate of a pesticide, insecticide, herbicide or fungicide to the spray device,
  means for delivering the concentrate in the direction of the outlet, and
  a control unit
  and a replaceable cartridge comprising means for reversibly connecting the cartridge to the spray device,
characterized in that the cartridge has an electronic memory unit which is read by the control unit of the spray device when the cartridge is connected to the spray device and in which data about setting a dilution ratio of concentrate to the diluent are stored.

An additional object of the present invention is a method for application of an active substance formulation, comprising the following steps:

- providing a replaceable cartridge with an active substance concentrate, wherein the cartridge comprises an electronic memory unit, wherein a dilution ratio is stored in the memory unit,
- providing a spray device with a diluent, wherein the spray device comprises a control unit, wherein the control unit has means for reading the dilution ratio from the memory unit,
- connection of the replaceable cartridge to the spray device by a user,
- reading out a dilution ratio from the memory unit by the control unit,
- regulating the flow or flows of the active substance concentrate and/or the diluent from their containers in the direction of the outlet, so that a mixture of active substance concentrate and the diluent emerges from the outlet, in which the active substance concentrate is diluted according to the dilution ratio read.

According to the present invention the active substance concentrate and diluent are present in separate containers. However, the user does not need to perform the actual dilution of the active substance concentrate manually. Instead the mixture takes place automatically during the spraying process. The user does not even have to be concerned about the ratio in which the active substance concentrate and the diluent are to be mixed. The correct mixing ratio is set by a control unit which receives the mixing ratio from the concentrate cartridge, and which regulates the flow of diluent and/or concentrate in such a manner that the mixture leaves the spray device through the outlet in the correct mixing ratio.

The individual elements that characterize the system according to the invention, the cartridge, the spray device and the method, will be explained in further detail in the following. In this explanation no distinction is made between the individual objects of the invention (cartridge, spray device, system and method). Instead, the descriptions below are analogously applicable for all objects of the invention, regardless of the context in which they appear.

An object of the present invention is a portable spray device. Portable means that the device can be transported from one location to another location without mechanical assistance.

The spray device comprises a container for receiving a diluent. The diluent is used for mixing with the concentrate and thus achieving dilution of the concentrate.

The diluent and the concentrate are both liquids. The term "liquid" should also include solutions, emulsions and suspensions.

In a preferred embodiment, the diluent is water.

The concentrate is preferably an active substance concentrate. Active substance concentrate is defined as a formulation of an active substance that exists in concentrated form and must/should be diluted before application. An active substance is a substance or a mixture of substances that has biological activity. Examples of active substances are pesticides, insecticides, herbicides and fungicides. In a particularly preferred embodiment, the concentrate is a pesticide concentrate.

The container for receiving the diluent can consist of any desired material compatible with the diluent. The term "compatible" means that the material should not be chemically attacked by the diluent and that the material should be impermeable for the diluent.

The container may be designed as a tank that can withstand positive pressure. The positive pressure can be used to deliver the diluent from the tank in the direction of the outlet.

In a preferred embodiment, the container is operated at zero pressure. Since the container does not need to withstand positive pressure, it may be made of a thin-walled, light material.

In a particularly preferred embodiment the container is designed as a flexible bag. Such a bag preferably has straps so that it can be strapped onto the back like a backpack and carried.

In one embodiment the spray device is designed such that user carries part of the spray device, comprising the container, in one hand, and another part of the spray device, comprising the outlet, in the other. Preferably the device is designed such that the user can wear part of the spray device comprising the container on their back and transport it. Another part, comprising the outlet, is carried in the hand as before, but now the other hand is free. For this purpose, the device is equipped with suitable straps.

The spray device according to the invention also has means for delivering the diluent from the container in the direction of the outlet. As was previously described, the diluent can be delivered from the container in the direction of the outlet with the aid of pressure. This pressure can be generated, for example, with a manual or electrically operated pneumatic pump or with a pressure cartridge.

Preferably the diluent is delivered in the direction of the outlet using an electrically operated pump.

In addition, the spray device according to the invention has means for reversibly connecting a replaceable cartridge to the spray device. The cartridge holds the concentrate. The cartridge and the spray device have mutually compatible means for attaching the cartridge to the spray device.

When the cartridge is connected to the spray device, the concentrate contained in the cartridge can be delivered from the cartridge through parts of the spray device in the direction of the spray device outlet.

The connection of the cartridge to the spray device can take place, for example, through a screw connection or a bayonet connection.

The cartridge is replaceable; in other words, this means that it can be connected to the spray device and removed later. Preferably, when it has been emptied, it is removed and optionally replaced by another cartridge or a new cartridge.

The cartridge is made such that it is impermeable to the concentrate and is not chemically attacked by the concentrate.

In a preferred embodiment the cartridge is made at least partially of plastic. Plastics are well known for being chemically inert toward many substances. They are also light and easy to process into almost unlimited forms.

In a preferred embodiment, the cartridge is designed as a pressure container. Preferably, in addition to the concentrate it contains a pressurized propellant separate from the concentrate. The cartridge preferably has a valve. The valve is preferably opened automatically when the cartridge is connected to the spray device. The pressurized propellant forces the concentrate out of the cartridge into the spray device. An additional valve located in the spray device stops the further flow of the concentrate. This valve preferably opens when the user starts an application process, preferably by manipulating a knob.

The cartridge preferably designed as a pressure container may, for example, be made of aluminum or tinplate—materials that are pressure-resistant and are used, for example, in spray cans (foaming shave cream).

It is conceivable that the cartridge contains a bag with the concentrate, wherein the bag is connected to the valve (valve-bag system). The propellant surrounds the bag filled with the concentrate and applies the necessary pressure for forcing the concentrate out of the cartridge (see, for example, DE69820260T2m U.S. Pat. No. 5,505,039m RPOT 8212A).

However, it is also conceivable that the propellant and the concentrate are separated from one another by a piston (see, for example, DE3934237A1). The propellant exerts pressure on the piston. When the valve is opened, the concentrate is forced out of the cartridge by the piston. For example, the use of a ZIMA piston is conceivable.

The cartridge can be designed as a single-use container or a reusable container.

The cartridge has an electronic memory unit.

The term electronic memory integrates all memory media that store data in or on the basis of electronic (semiconductor) components. The following may be mentioned as examples: ROM (read-only memory), PROM (programmable read-only memory), EPROM (erasable programmable read-only memory, flash-EEPROM (e.g., USB memory sticks), FRAM (ferroelectric random access memory), MRAM (magnetoresistive random access memory) and phase-change RAM (phase-change random access memory).

A dilution ratio is stored in the memory unit, or data on the basis of which a dilution ratio can be determined are stored. The dilution ratio indicates the ratio in which the concentrate and a diluent (usually water) should be mixed together to achieve a desired effect.

The spray device has a control unit. The control unit is capable of reading the data on the dilution ratio from the memory unit of the cartridge. The means for reading out the memory unit and the memory unit itself are suitably adapted to one another. There are numerous possibilities for achieving this communication between control unit and memory unit. One of these possibilities will be described in the following.

For example, one possibility for reading-out consists of providing the cartridge with an RFID tag. An RFID tag has an electronic memory unit. Therefore, these control units have means for reading the electronic memory unit in the RFID tag.

In this case the reading is done by a non-contact method. In addition to the communication form mentioned, other non-contact communication methods between the electronic memory unit and the control unit are conceivable, such as Bluetooth or near-field communication.

However, communication may also take place by hardwired means. For example, it is conceivable that both the cartridge and the spray device may have electrical or optical contacts which, when the cartridge is connected to the spray device, produce electrical or optical contact between the cartridge and the spray device, over which the control unit can access the electronic memory unit of the cartridge.

In addition to a dilution ratio to be set, additional data may be stored in the memory unit of the cartridge, for example the type of material, lot number, shelf life and the like.

It is conceivable for the dilution ratio to be stored directly in the memory unit of the cartridge. However, it is also conceivable that an identifier for the cartridge and/or the concentrate contained in the cartridge to be stored in the memory unit. An identifier of this type, for example, may be an identification number. The control unit is capable of reading the identifier from the memory unit. It is conceivable for the control unit to contain a registry in which various concentrates are stored together with a dilution ratio to be set and the identifier, so that the control unit, by reading the identifier, can obtain the dilution ratio to be set from the register. However, it is also conceivable for the control unit to access an external database using a mobile network and, based on the identifier, to obtain a dilution ratio to be set from the external database.

The spray device according to the invention has means for delivering the concentrate from the cartridge in the direction of the outlet. This preferably involves an electrically operated pump.

In a particularly preferred embodiment, a stepping motor proportioning pump is used (see, for example: DE102004047584, WO2012048976, DE102009006203). when a stepping motor drive is used, even small amounts of the concentrate can be added to the diluent.

The control unit determines the required or desired dilution ratio and regulates the flow of the diluent and/or the concentrate correspondingly. Here also, various variants are conceivable; some of them are described in the following.

For example, it is conceivable for the diluent to be delivered from the container in the direction of the outlet and the flow determined using a flowmeter. The flowmeter can be connected to the control unit and configured such that depending on the flow of the diluent in the direction of the outlet, it regulates the flow of the concentrate such that a constant mixing ratio is adjusted between the concentrate and the diluent. Thus, while the diluent is flowing, the flow is measured and exactly the right amount of concentrate is supplied to the diluent so that a mixture with the desired/required mixing ratio (degree of dilution) results.

"Constant mixing ratio" means that the mixing ratio stays within a predefined range over the duration of spraying.

The opposite variant is also possible: the concentrate is delivered in the direction of the outlet, the flow is measured, and exactly the amount of diluent is supplied to the concentrate so that the desired/required dilution ratio results.

It is also conceivable that the flows of diluent and concentrate will be adapted mutually by regulators to achieve the desired/required degree of dilution. In such a case, both flows will be detected by corresponding sensors.

In a preferred embodiment the diluent is delivered with a first electric pump from the container in the direction of the outlet. The flow of the diluent is determined with a flowmeter and the measured values are sent to the control unit. The control unit is connected to a second electric pump and regulates the flow of the concentrate in the direction of the outlet such that the concentrate and diluent leave the spray device through the outlet as a mixture with the desired/required mixing ratio.

Using a flowmeter, the quantity of fluid flowing in the direction of the spray nozzle per unit time is detected. The flow quantity is defined as the volume or the mass, depending on the measurement method used.

The flowmeter is preferably of the type conventionally used in closed pipelines, for example a magnetic conductive flowmeter, a float flowmeter, an ultrasonic flowmeter, a Coriolis mass flowmeter, a calorimetric flowmeter or a vortex flowmeter. However, the use of an orifice plate dynamic pressure probe is also conceivable In a preferred embodiment, the flow measurement is performed using a differential pressure sensor.

In an additional preferred embodiment, a flywheel sensor is used for flow measurement. The measurement principle is based on the fact that a flywheel assumes a rotation speed proportional to the flow velocity of a fluid driving the flywheel. A permanent magnet can be attached to the flywheel and moved around with the flywheel for measuring the rotation speed. A Hall sensor, passed which the permanent magnet moves, can be used as a pulse counter. The number of pulses counted per unit time is proportional to the rotation speed of the flywheel and thus to the flow rate of the fluid.

Details on the flow measurement can, for example, be taken from the following textbook: K. W. Bonfig: Technische Durchflussmessung [Industrial Flow Measurement], Vulkan-Verlag Essen, $3^{rd}$ Ed., 2002, ISBN 3-8027-2190X.

A mixture of active substance concentrate and diluent leaves the spray device through the outlet.

It is conceivable to combine the diluent and concentrate in a suitable feed line before the outlet. However, it is also conceivable that a mixing chamber would exist in front of the outlet, with diluent and concentrate being introduced into it in two separate feed lines. Then, thorough mixing of the diluent and concentrate takes place, followed by the mixture leaving the spray device through the outlet.

The thorough mixing of diluent and concentrate can be promoted by various measures, for example using static mixing elements.

Preferably a spray nozzle is attached to the outlet.

The spray nozzle makes it possible to achieve a desired three-dimensional distribution of the applied mixture. Usually the spray nozzle converts the liquid passing through it into drops with a specific droplet-sized distribution which depends, on other things, on the pressure on the liquid, the flow rate of the liquid and the geometry of the spray nozzle.

The spray nozzle is preferably replaceable, so that a user can select a spray nozzle with a desired droplet sized distribution and three-dimensional distribution of the material being sprayed to the application and target object.

The spray nozzle can for example be of a lance or pistol shape or have another shape. It is preferably designed such that the user can hold it in one hand and direct it to the target object.

The spray nozzle usually has a knob which the user will press to start a spraying process. Usually a valve is opened by operating the knob, so that the diluent and the concentrate are delivered from their respective containers in the direction of the spray nozzle and through the spray nozzle, onto the target object.

In a preferred embodiment the replaceable spray nozzle and the control unit have means that make it possible for the control unit to detect the presence of a spray nozzle and/or the type of spray nozzle present. For example, it is conceivable that the control unit will only initiate the delivery of the liquids from their containers in the direction of the spray nozzle when a spray nozzle is also connected. If no spray nozzle is connected, no delivery takes place, for example for safety reasons. It is also conceivable that the control unit will adapt the parameter for delivery of the fluid to the type of spray nozzle present to achieve optimal spraying results. This minimum pressure could be encoded on the spray nozzle in a manner that can be read by the control unit, so that the user need not adjust such parameters manually.

A pressure usually builds up in front of the spray nozzle. It is conceivable that this pressure must lie in a defined range to have an optimal spray result.

Therefore, in a preferred embodiment a pressure sensor is attached in front of the spray nozzle and connected to the control unit. Using the pressure sensor, the control unit regulates the flow of diluent and/or concentrate so that the pressure always stays within a defined range.

Preferably a valve is attached in front of the outlet. This valve can be opened and closed manually or automatically.

Preferably this valve can be manually operated, so that the user can direct the spray nozzle attached at the outlet to a target object and start the spraying process by manually opening the valve.

It is also conceivable for the valve to be opened automatically. For example, it is conceivable that the spray device would have a sensor that recognizes the position of the spray nozzle in three dimensions, and at a certain position, automatically opens or closes the valve. It is conceivable for example for the valve to be closed when the spray nozzle is directed toward the floor and opened when the spray nozzle is raised to the horizontal position.

It is also conceivable for the valve to be opened automatically when the spray nozzle approaches the target object. This can take place, for example, using sensors or with GPS support (GPS=Global Positioning system).

In another preferred embodiment the amount of concentrate applied is determined and stored. The memory may take place in the control unit of the spray device and/or in the memory unit of the cartridge. Preferably the residual amount of concentrate that remains in the cartridge is determined and stored. In turn the memory can take place in the control unit of the spray device and/or in the memory unit of the cartridge.

In a preferred embodiment an external computer system is part of the system according to the invention. "External" here means that the computer system is not an integral part of the spray device and is also not part of the cartridge. However, the computer system can have a communicative connection with the control unit of the spray device and/or the memory unit of the cartridge to perform data transfer. Data can be transmitted from the computer system to the memory unit, for example to transfer product data, the dilution ratio to be set for the concentrate, or the like. It is also conceivable that data from the control unit would be transmitted to the computer system, for example data on the amount of concentrate applied and/or the spraying duration and/or the spraying location and/or the user. It is likewise conceivable that data from the computer system would be transmitted from the computer system to the control unit, for example, data for a spray application.

In the following, the invention will be explained in further detail based on exemplified embodiments, but without limiting the invention being limited to these examples.

FIG. 1 schematically shows an embodiment of the system according to the invention. The system comprises a spray device according to the invention and a cartridge according to the invention.

The spray device according to the invention comprises a container (10) with a diluent (11), an outlet (30), means (15) for delivering diluent (11) from the container (10) in the direction of the outlet (30), a valve (40), means (22*b*) for attaching a replaceable cartridge (20), an electrically operated pump (25) for delivering a concentrate (21) located in the cartridge (20) from the cartridge (20) in the direction of the outlet (30), a flowmeter (2) for measuring the flow of the diluent (11) from the container (10) in the direction of the outlet (30) and a control unit (1).

The means (15) for delivering the diluent (11) from the container (10) in the direction of the outlet (30) are represent schematically in FIG. 1 as an arrow, which only indicates the direction of flow. The arrow does not mean that the corresponding means must be located at this point in the feed line.

The outlet (30) is designed as a spray nozzle. Through the spray nozzle the diluent and the concentrate leave the spray device in the form of a mixture (50) with a constant mixing ratio.

The cartridge (20) according to the invention contains the concentrate (21). The cartridge has means (22a) for reversibly connecting the cartridge (20) to the spray device. The cartridge (20) according to the invention also has a memory device (28). A mixing ratio (dilution ratio) is stored in this memory unit (28).

The control unit (1) has access to the memory unit (28) (the access is shown by the broken line) and can read the mixing ratio stored there.

The control unit (1) is also connected to the flowmeter (2) and the pump (25). When the valve (40) is opened (manually or automatically), the diluent (11) is delivered from the container (10) in the direction of the outlet (30). The flow of the diluent (11) is determined using the flowmeter (2). On the basis of the flow measured by the flowmeter (2), the control unit (1) regulates the amount of concentrate delivered by the pump (25) to the diluent (11), so that the mixing ratio read from the memory unit (28) is established.

FIG. 2 shows a preferred embodiment of the spray system according to the invention.

The spray device according to the invention comprises a container (10) with a diluent (11), an outlet (30), a first pump (15) for delivering the diluent (11) from the container (10) in the direction of the outlet (30), a valve (40), means (22b) for connecting a replaceable cartridge (20), a second pump (25) for delivering the concentrate (21) present in the cartridge (20) from the cartridge (20) in the direction of the outlet (30), a flowmeter (2) for measuring the flow of the diluent (11) from the container (10) in the direction of the outlet (30), a pressure sensor (3) for measuring the pressure in a feed line to the outlet (30) and a control unit (1).

The outlet (30) is designed as a spray nozzle. The diluent (11) and the concentrate (21) exit from the spray device through the spray nozzle in the form of a mixture (50) having a constant mixing ratio.

The container (10) is designed as flexible bag. It comprises an opening with a reclosable closure (12), through which the diluent (11) can be filled into the bag.

The cartridge (20) according to the invention contains the concentrate (21). The cartridge has means (22a) for reversible connection of the cartridge (20) to the spray device. In addition, the cartridge (20) according to the invention has a memory unit (28). A mixing ratio (dilution ratio) is stored in the memory unit (28).

The control unit (1) has access to the memory unit (28) (the access is shown by the broken line) and can read the mixing ratio stored there.

The control unit (1) is also connected to the flowmeter (2), the pump (25) and the pressure sensor (3). When the valve (40) is opened (manually or automatically), the diluent (11) is delivered from the container (10) in the direction of the outlet (30). The flow of the diluent (11) is registered by the flowmeter (2). The control unit (1) regulates, based on the flow measured by the flowmeter (2), the quantity of concentrate (21) supplied by the pump (25) to the diluent (11), so that the mixing ratio read out of the memory unit (28) is established.

By means of the pressure sensor (3), the control unit (1) regulates the flow of diluent and/or concentrate such that the pressure in the feed line to the spray nozzle is always within a defined range.

The invention claimed is:

1. A cartridge comprising:
   a concentrate of a pesticide, insecticide, herbicide or fungicide;
   a connector configured to removably connect the cartridge to a portable spray device configured to be carried by a user and that can disperse a mixture of the concentrate with a liquid diluent during a spraying process; and
   a memory storing data of a dilution ratio of the concentrate with the liquid diluent and that is configured to cause the portable spray device, when connected to the spray device, to combine the liquid diluent and the concentrate into a mixture that is dispersed from an outlet at the dilution ratio over a duration of the spraying process, and wherein the portable spray device is caused to regulate a flow of the concentrate towards the outlet based on a measured flow rate of the liquid diluent to maintain the mixture at the dilution ratio read from data stored in the memory of the cartridge.

2. The cartridge of claim 1, wherein the cartridge comprises an RFID tag and the memory unit is part of the RFID tag.

3. The cartridge of claim 1, wherein the memory is configured to update data stored in the memory during or after the spraying process.

4. The cartridge of claim 1, wherein the memory stores data related to a quantity of concentrate contained in the cartridge.

5. The cartridge of claim 4, wherein the memory is configured to be updated after use of the cartridge to store data related to the quantity of concentrate remaining in the cartridge after the use.

6. The cartridge of claim 1, wherein the cartridge is pressurized.

7. The cartridge of claim 1, wherein the connector comprises a screw connection or a bayonet connection.

8. The cartridge of claim 1, wherein the cartridge is a single-use container.

9. The cartridge of claim 1, wherein the memory stores data identifying the type of concentrate in the cartridge.

10. The cartridge of claim 1, wherein the memory stores data identifying a lot number of the concentrate in the cartridge.

11. The cartridge of claim 1, wherein the memory stores data identifying a shelf life of the concentrate in the cartridge.

12. A portable spray device for diluting a concentrate during a spraying process comprising:
   a diluent container for containing a liquid diluent;
   a flowmeter configured to measure a flow rate of the liquid diluent flowing towards an outlet;
   a connector configured to removably connect to a replaceable cartridge containing a concentrate of a pesticide, insecticide, herbicide or fungicide; and
   a control unit configured to:
   read a dilution ratio of the concentrate with the liquid diluent from data stored in a memory unit of the replaceable cartridge, and
   control delivery of the liquid diluent from the diluent container towards the outlet and the concentrate from the replaceable cartridge towards the outlet according to the read dilution ratio such that the liquid diluent and the concentrate are combined in a mixture that is dispersed from the outlet at the dilution ratio over a duration of the spraying process, wherein the flow of the concentrate towards the outlet is regulated based on the measured flow rate to maintain the dilution ratio read from data stored in a memory unit of the replaceable cartridge, and wherein the portable spray device is configured to be carried by a user.

13. The spray device of claim 12, wherein the spray device is a backpack device.

14. The spray device of claim 12, wherein the spray device comprises a RFID reader configured to read from a RFID tag on the replaceable cartridge.

15. The spray device of claim 12, wherein the spray device is configured to update data stored in the memory of the cartridge during or after the spraying process.

16. The spray device of claim 12, wherein the spray device is configured to update data in the memory of the cartridge related to the quantity of concentrate remaining in the cartridge after a use.

17. The spray device of claim 12, wherein the cartridge is pressurized.

18. The spray device of claim 12, wherein the connector comprises a screw connection or a bayonet connection.

19. The spray device of claim 12, wherein the cartridge is a single-use container.

20. The spray device of claim 12, wherein the spray device is configured to determine a type of concentrate in the cartridge from data stored in the memory of the cartridge.

21. The spray device of claim 12, wherein the spray device is configured to determine a lot number of the concentrate in the cartridge from data stored in the memory of the cartridge.

22. The spray device of claim 12, wherein the spray device is configured to determine a shelf life of concentrate in the cartridge from data stored in the memory of the cartridge.

23. The spray device of claim 12, wherein the diluent container comprises a flexible bag.

24. The spray device of claim 12, wherein the spray device is configured to communicate with an external computer system.

25. The spray device of claim 24, wherein the spray device is configured to communicate with the external computer system using a mobile network.

26. The spray device of claim 24, wherein the spray device is configured to transmit information from the memory of the cartridge to the external computer system.

27. The spray device of claim 12, comprising:

a valve configured to control the spraying process such that when the valve is opened, the portable spray device is configured to disperse the mixture of the diluent and the concentrate through the outlet at the read dilution ratio over the duration of the spraying process.

* * * * *